Figure 1:
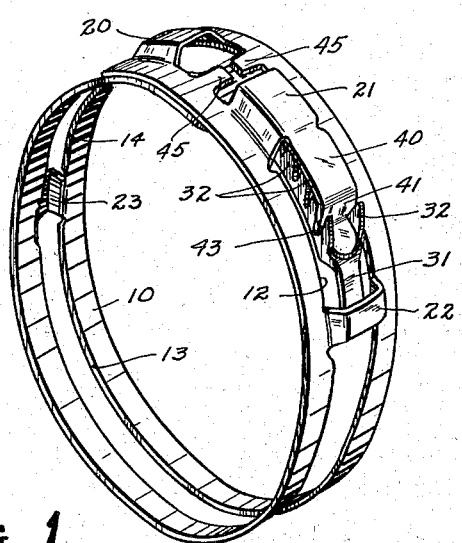

April 24, 1945.  R. A. HARTMAN  2,374,541
CONDUIT CLAMP
Filed June 19, 1943  2 Sheets-Sheet 1

INVENTOR.
RICHARD A. HARTMAN
BY Bates Teare & McBean
ATTORNEYS

April 24, 1945.  R. A. HARTMAN  2,374,541
CONDUIT CLAMP
Filed June 19, 1943  2 Sheets-Sheet 2

INVENTOR.
RICHARD A. HARTMAN
BY Bates, Teare & McBean
ATTORNEYS

Patented Apr. 24, 1945

2,374,541

UNITED STATES PATENT OFFICE 2,374,541

CONDUIT CLAMP

Richard A. Hartman, Cleveland, Ohio, assignor to Tinnerman Products, Inc., Cleveland, Ohio, a corporation of Ohio Application June 19, 1943, Serial No. 491,535

18 Claims. (Cl. 24—20)

This invention relates to a clamp adapted to bind a tubular member on an embraced member. The invention has its more particular application in the securing of a conduit having a yielding or resilient wall about a rigid tube as, for instance, the mounting of a rubber-like connecting conduit between a source of supply and a discharge conduit. The invention comprises an embracing band, the end portions of the band having interlocking shoulders which may engage each other in various positions to hold the band closed about the embraced yielding wall.

One object of the invention is to provide such a clamp in a form which may obtain a very t'ght grip on the rubber conduit without injuring the same. Another object is to provide a clamp which will compress the wall of the conduit against the wall of the embraced tube, so that the joint will withstand high internal pressures without leakage. Another object is to provide a readily applied ratchet connection between the two ends of the band, enabling the band to be readily constricted to obtain the desired tight clamping action and to hold itself closed in the selected position. Another object is to provide such a fastening band in a form which can be readily and economically manufactured by a cutting stamping operation from a single strip of sheet material.

In accomplishing the above objects, I provide a band of resilient sheet material in the form of a loop, the ends of which are adapted to overlap. In one end portion of the loop I make a slot lengthwise of the band and provide a pawl overhanging the slot and at the other end of the band I provide a tongue adapted to occupy the slot and having outwardly projecting teeth any of which may coact with the pawl.

My invention may be more fully understood from the detailed description of a preferred embodiment hereof illustrated in the drawings. Various features contributing to the utility and efficiency of the device will be apparent from such description.

Figure 2:
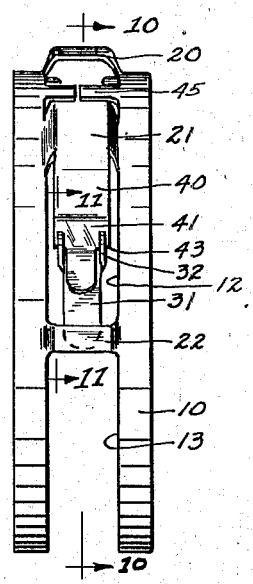
Figure 3:
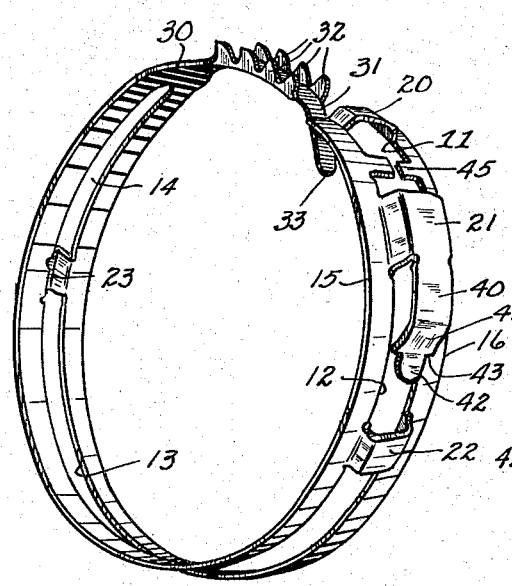
Figure 4:
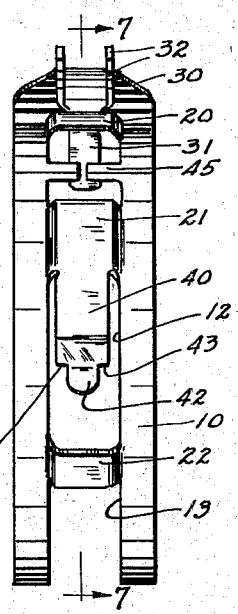
Figure 5:
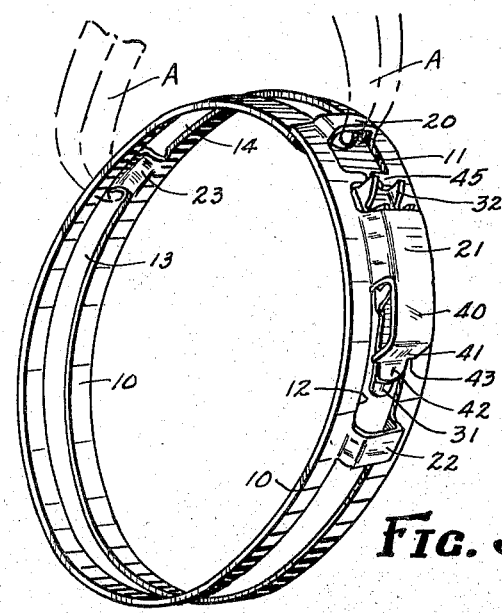
Figure 6:
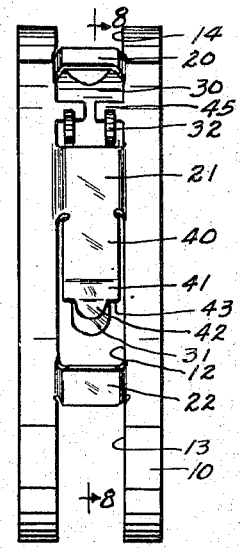
Figure 7:
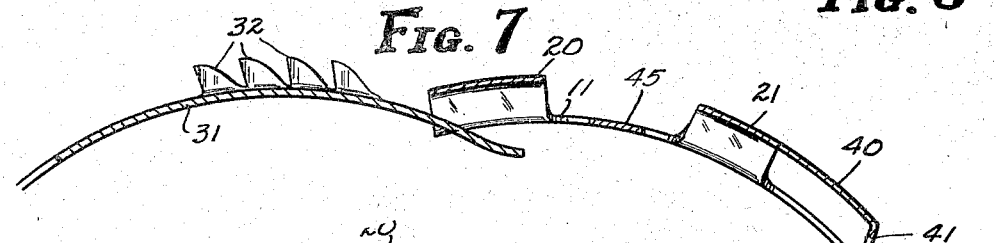
Figure 8:
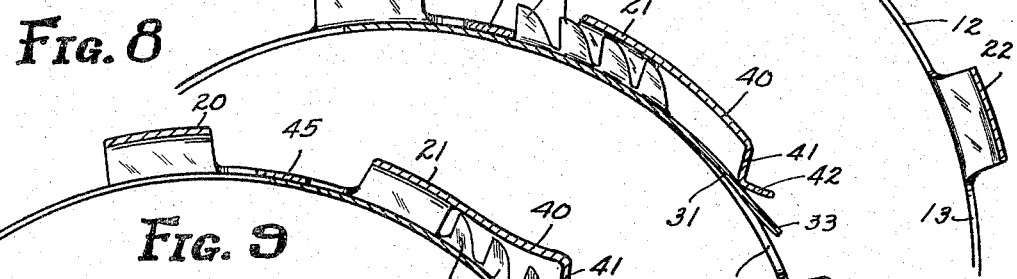
Figure 9:
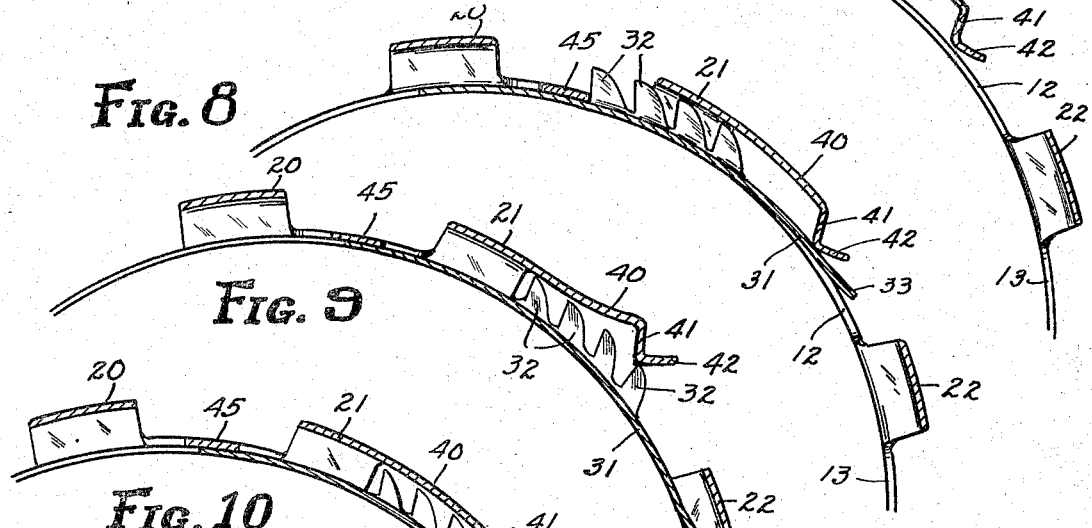
Figure 10:
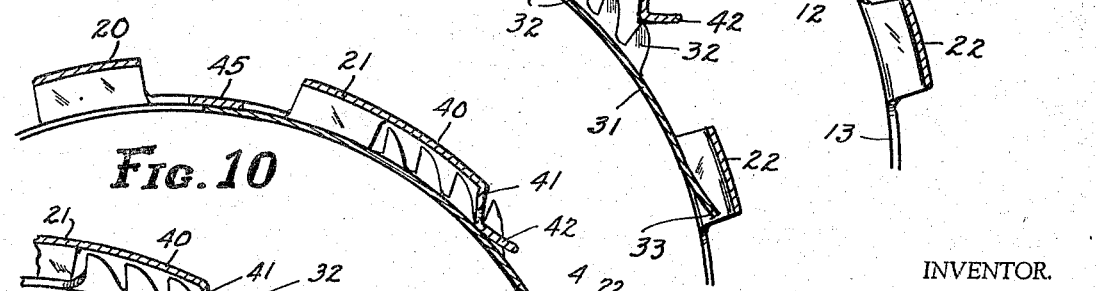
Figure 11:
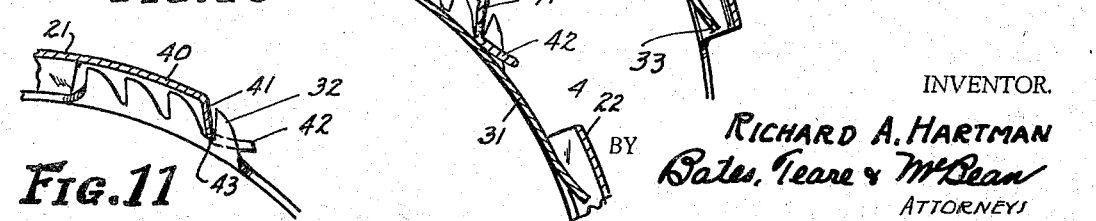

In the drawings, Fig. 1 is a perspective of my conduit clamp in closed position: Fig. 2 is an edge elevation thereof looking toward the right hand region of Fig. 1; Fig. 3 is a perspective of my clamp in open position; Fig. 4 is an edge elevation thereof looking toward the right hand region of Fig. 3; Fig. 5 is a perspective illustrating the clamp in the process of being closed; Fig. 6 is an edge elevation of the clamp shown in Fig. 5, looking toward the right hand region thereof. The remaining figures are diagrams; Fig. 7 illustrates the relative position of the two end portions of the clamp in the normal or unapplied condition indicated in Figs. 3 and 4. This diagram may be considered as a fragmentary section on the line 7—7 of Fig. 4. Fig. 8 indicates a temporarily closed or pre-latched position, where the rearmost tooth engages a cross portion of the other end of the band as shown in Figs. 5 and 6. This diagram may be considered a fragmentary section on the line 8—8 on Fig. 6. Fig. 9 is a section of the parts shown in Fig. 8 in the act of further closing, the locking pawl being cammed outwardly by the foremost tooth. Figs. 10 and 11 indicate one of the final closed positions showing the pawl engaging the foremost tooth and being in effect sections on the correspondingly numbered lines on Fig. 2. The different cross-sectioning employed in the diagrams is for clearness of illustration only, as all of the parts are integral with each other.

As shown in each of the views, 10 designates the body of the band which is a parallel-sided strip of resilient sheet material preferably spring steel. This band is intermediately slotted longitudinally by a succession of parallel-sided slots designated 11, 12, 13 and 14, extending longitudinally and centrally of the band. This leaves two parallel narrow side strips 15 and 16 connected by various cross bridges, of which four are shown, indicated at 20, 21, 22 and 23. These bridges are all offset intermediately from the outer plane of the band so that the successive slots are really connected with each other by grooves on the interior of the successive bridges.

Near one end of the band the two side members 15 and 16 are joined by a common inwardly directed Y-shaped part 30 terminating in a longitudinal tongue 31 narrower than the slots. The edges of this tongue are flanged outwardly. These two flanges are parallel with each other and each is serrated to provide a succession of ratchet teeth 32 facing away from the free end 33 of the tongue.

The total width of the flanged and serrated tongue is less than that of the slots in the body and the grooves beneath the body bridges, so that the tongue with its teeth may readily sl'de beneath the bridges, the tongue occupying the slots 11 and 12.

The bridge 21 has its top surface extended to form an integral spring tongue 40 which intermediately bends toward the body of the band shown at 41 and then has a final lip 42 narrower than the tongue to leave abrupt shoulders 43.

Between the end bridge 20 and the tongue carrying bridge 21, I extend lugs 45 inwardly from the two side strips 15 and 16, the purpose of wh'ch will be hereinafter explained.

Figs. 3, 4 and 7 illustrate the above described band before it is put in place, one end being entirely free from the other. Such ends may be separated far enough to allow the band to be passed laterally across any conduit which the band may clamp, or the band may be shoved axially over the end of the conduit before its application, if more convenient.

In applying the band shown in Figs. 3, 4 and 7, to a conduit, one may utilize a suitable tool like a pair of pliers the jaws of which (indicated at A in Fig. 5) engage the endmost bridges 20 and 23 and by forcing them together constrict the band. In this operation, the free end of the tongue 31 is held beneath the overlapping band by the inwardly projecting lugs 45 shown in Fig. 4 and the tongue thus passes under the bridge 21 and under the pawl 40. The teeth 32 in this closing operation pass under and beyond the lugs 45 and as soon as the final tooth has cleared those lugs the overlapping portions spring together, several of the teeth occupying a space beneath the bridge 21 and adjacent regions as shown in Fig. 8, while the rearmost tooth engages the far edge of the lugs 45. This is the partially closed or pre-latched position of the clamp illustrated in Figs. 5 and 6.

By providing the temporarily holding position described, one is able to mount one or more of the clamps on the conduit and still allow adjustment of the conduit on the member embraced, after which the clamp is moved into its final position. The pre-latched mounting of the clamp also enables the ready application of the tool to effect the final clamping of the band in place.

Following the temporary holding of the clamp, as illustrated in Figs. 5, 6 and 8, one applies further pressure to the two endmost bridges to cause the teeth 32 to slide along the space beneath the pawl 40 until a tooth is engaged by the shoulder 43. This movement is illustrated in Fig. 9, where the nose made by the inward portion 41 and the lip 42 of the tongue has ridden up on the endmost tooth 32 and is engaging the point thereof. A slight further movement causes the pawl to spring down toward the base of the teeth with the lip 42 lying between the selected pair of teeth and shoulder 43 engaging such teeth.

While the ratchet faces of the teeth incline backwardly from the free end of the tongue, such surface very nearly conforms to an arc about the anchored end of the spring pawl so that there is substantially no back latch as the pawl comes into final position and no loosening of the clamp though the pawl obtains a firm hold on the teeth engaged.

The closed position just described is indicated in Figs. 1, 2, 10 and 11. These views show the tongue shoulder engaging the foremost tooth 32 but the engagement might be with any of the other teeth, depending on the extent to which the band has been tightened about the member clamped. I have shown four teeth, which I have found to be a convenient number, thus allowing selection of any one of four final positions in addition to the first temporary position, but the number of teeth may be increased or decreased, if desired.

It will be seen that my band is readily applied to the exterior of the yielding tubular member and when tightened may clamp such tubular member with a very substantial force upon the embraced conduit connection. In such clamping, the slots in the body of the band enable such body to more readily sink into the yielding material, which thus bows upwardly in the slots so that the band is locked against longitudinal shifting and also concentrates its pressure on the yielding member on the conduit. I am thus enabled to make such a tight clamping of a yielding hose on a tubular member that there is no danger of separation of the hose from its embraced conduit, or leakage in such region, due to any pressure which the hose itself is able to carry.

It will be noticed that the spring tongue 40 being substantially a straight continuation of the unstressed top portion of the carrying bridge is not initially stressed in the formation of the clamp and thus readily springs in and out. This is an advantage not only in avoiding any possibility of making a permanent set in the pawl as it moves outwardly to clear the teeth, but also in allowing the ready unlatching of the clamp. The insertion of a suitable prying tool beneath the upturned lip 42 enables the raising of the tongue to effect the unlatching no matter how tightly the clamp may have been set.

Finally, it should be noted as one of the very decided advantages of my clamp is that the parts which are directly stressed in the clamping action, namely, the toothed portion of the tongue and the body of the band in the vicinity of the pawl, lie in the same cylindrical surface, while the free end portions of the tongue and of the band adjacent the end bridge 20, where the band overlaps the other end portion, are entirely free from any outside pressure. The result is that the latter portion of the band may slide freely over the seated tongue-carrying portion without any danger of scuffing the embraced yielding wall. This avoids the injury to the wall which has heretofore resulted in those clamps having two approaching shoulders which pinch the wall as the clamp is tightened.

I claim:

1. A conduit clamp comprising a loop of resilient material having at one end a tongue with outwardly projecting teeth and at the other end a slot which the tongue may occupy and an overhanging pawl, said pawl being adapted to extend inwardly into contact with the teeth when the tongue occupies the slot.

2. A conduit clamp comprising a single strip of resilient sheet material having one end narrowed to form a tongue, said tongue having outwardly projecting ratchet teeth and at the other end portion of the strip having a slot and an overhanging inwardly acting pawl, said pawl being adapted to coact with the teeth when the tongue occupies the slot.

3. A clamp made of a strip of resilient sheet material having adjacent one end a tongue having its opposite edges flanged and provided with teeth, said strip having a slot adjacent the other end and a surmounting pawl adapted to coact with the teeth when the tongue occupies the slot.

4. A conduit clamp comprising a resilient band having at one end a tongue with outwardly projecting teeth and adjacent the other end a slot and a raised bridge extending over the slot and connecting the regions of the band on opposite sides thereof and allowing the passage of the teeth while the tongue is in the slot, and a pawl carried by such bridge and adapted to coact successively with teeth on the tongue.

5. A clamp comprising a band of resilient sheet material having at one end a tongue with outwardly projecting teeth at its opposite edges, the other end of the band being slotted longitudinally providing parallel side strips connected by raised bridges enabling the teeth to pass under the bridges while the overlapping ends are close to an embraced conduit, and a pawl carried by one of the bridges and having an inwardly extending nose to coact with the teeth.

6. A conduit clamp comprising a strip of resilient sheet material having at one end a tongue with outwardly projecting teeth and adjacent the other end a slot and a raised bridge extending over the slot and connecting the regions of the band on opposite sides thereof, and a flexible tongue formed by an extension of the top portion of the bridge and adapted to coact successively with said teeth.

7. A clamp comprising a single strip of spring material having at one end a tongue of reduced width with its edges flanged outwardly and serrated to provide teeth, the other end portion of the band having a longitudinal slot surmounted by a raised bridge beneath which the teeth may pass, the top portion of the bridge carrying a pawl to engage successive teeth.

8. A clamp comprising a single strip of spring material having at one end a tongue of reduced width with its edges flanged outwardly and serrated to provide ratchet teeth with their active edges inclined away from the free end of the tongue, the other end portion of the band having a slot surmounted by a raised bridge beneath which the teeth may pass, the top portion of the bridge continuing as a tongue, the nose of which is bent inwardly to engage successive ratchet teeth.

9. A clamp comprising a single strip of resilient sheet material having longitudinally aligned slots surmounted by raised cross bridges connecting the side regions of the strip, a central tongue with outwardly projecting teeth at one end of the strip, said teeth being adapted to pass beneath the endmost bridge on the other end of the strip, and a locking pawl carried by another bridge on the strip and adapted to coact with the teeth.

10. A clamp comprising a strip of resilient sheet material having longitudinal slots surmounted by raised cross bridges connecting the side regions of the strip, a tongue with the outwardly projecting teeth at one end of the strip, said teeth being adapted to pass beneath the endmost bridge on the other end of the strip and a locking pawl to coact with the teeth, the two bridges nearest the ends of the strip providing shoulders for the application of a tool to tighten the band.

11. A clamp comprising a strip of spring sheet material longitudinally slotted for the major portion of its length providing two parallel-side strips, said side strips being connected by integral bridges which are offset outwardly, one of said bridges being substantially at one end of the strip, the other end of the strip being formed into a central tongue narrower than the strip and having outwardly projecting teeth adapted to pass beneath said end bridge, and a locking pawl carried by another raised bridge a comparatively short distance beyond said end bridge.

12. A clamp comprising a single strip of spring sheet metal longitudinally slotted for the major portion of its length providing two parallel side strips, said side strips being connected by integral bridges which are offset outwardly, one of said bridges being substantially at one end of the strip, the other end of the strip being formed into a central tongue narrower than the strip and having its edges flanged outwardly and serrated to provide teeth adapted to pass beneath said end bridge, another raised bridge a comparatively short distance beyond the end bridge having its top portion extended into a spring tongue which is diverted inwardly to engage successive teeth which may pass under the same in the closing of the clamp.

13. A clamp comprising a band of resilient character having a longitudinal slot extending from one end, a retaining pawl carried by that end portion of the band and overhanging the slot, the body of the band having a lug projecting into the slot in the region between the pawl and the adjacent end of the band, the other end of the band having a tongue with outwardly projecting teeth, one of which in closing of the band may engage the far edge of the lug for a temporary closure and any of which may engage the pawl for a permanent closure.

14. A clamp comprising a band of sheet material of resilient character having a longitudinal slot extending from one end and surmounted by cross bridges raised above the remaining side regions of the band, a retaining pawl carried by one of the bridges, the body of the band having a lug projecting into the slot in the region between the said pawl-carrying bridge and the adjacent end of the band, the other end of the band having a tongue with outwardly projecting teeth.

15. A clamp comprising a band with free ends having teeth adjacent one end and a pawl adjacent the other end adapted to coact with the teeth when the ends overlap, the part of the band carrying the teeth and the part carrying the pawl having their inner faces in the same cylindrical surface when the band is clamped about a cylindrical member.

16. A clamp comprising a continuous strip of resilient sheet material, outwardly projecting teeth on one end portion of the strip and an inwardly directed pawl on the other end portion adapted to coact with the teeth, said teeth and pawl being each set back from the adjacent extreme end of the strip, the portions of the strip in the interlocking region having their inner faces defining a single cylindrical surface when the band is applied to a cylindrical member, and the two endmost portions of the band beyond the teeth and pawl respectively being free from external constraint.

17. A clamp comprising a strip of resilient material having a longitudinal slot extending inwardly from one end and formed at the other end with a tongue adapted to enter the slot and extend across the slotted portion of the band, there being retaining means on the two end portions of the band adapted to interlock in the region where such end portions cross each other when the band is applied, whereby an uninterrupted interior surface results in the applied band.

18. A clamp comprising a strip of resilient material having a longitudinal slot extending inwardly from one end and formed at the other end with a tongue adapted to enter the slot and extend across the slotted portion of the band, there being a row of outwardly extending teeth on said tongue and an inwardly extending pawl on the slotted portion of the band overhanging the slot, said pawl being adapted to interlock with any of said teeth in the region where such end portions of the band cross each other when the band is applied.

RICHARD A. HARTMAN.